US007722835B2

(12) United States Patent
Malmqvist

(10) Patent No.: US 7,722,835 B2
(45) Date of Patent: May 25, 2010

(54) CLOSED REACTION VESSEL SYSTEM

(76) Inventor: Mats Malmqvist, Hurtigs gata 63, Uppsala (SE) 8E-754 39

( * ) Notice: Subject to any disclaimer, the term of this patent is extended or adjusted under 35 U.S.C. 154(b) by 636 days.

(21) Appl. No.: 11/579,199

(22) PCT Filed: Apr. 29, 2005

(86) PCT No.: PCT/SE2005/000628

§ 371 (c)(1), (2), (4) Date: Jun. 27, 2007

(87) PCT Pub. No.: WO2005/105282

PCT Pub. Date: Nov. 10, 2005

(65) Prior Publication Data

US 2007/0269355 A1 Nov. 22, 2007

(30) Foreign Application Priority Data

Apr. 30, 2004 (SE) .................................. 0401145

(51) Int. Cl.

| | |
|---|---|
| ***B01J 19/00*** | (2006.01) |
| *B01J 14/00* | (2006.01) |
| *B01L 3/00* | (2006.01) |
| *B01L 3/02* | (2006.01) |
| *G01N 35/08* | (2006.01) |

(52) U.S. Cl. ......................... 422/224; 422/99; 422/100; 422/102; 422/103; 422/104; 422/129; 422/236; 436/53

(58) Field of Classification Search .................. 422/99, 422/100, 102–104, 129, 224, 236; 436/53
See application file for complete search history.

(56) References Cited

U.S. PATENT DOCUMENTS 4,096,059 A * 6/1978 Pinkerton .................. 210/647
2002/0052049 A1 5/2002 Weigl et al.
2003/0183020 A1 10/2003 Kipke et al.

OTHER PUBLICATIONS

International Preliminary Report on Patentability and Written Opinion, dated Nov. 1, 2006, in International Application No. PCT/SE2005/000628.

* cited by examiner

*Primary Examiner*—Walter D Griffin
*Assistant Examiner*—Natasha Young
(74) *Attorney, Agent, or Firm*—Nixon & Vanderhye P.C.

(57) ABSTRACT

A closed and yet flexible and easily adaptable reaction vessel system for performing liquid handling operations, such as sampling, incubating, homogenizing and/or metering fluids, can be constructed in a modular fashion, comprising a first container, to which at least two second containers are connected, wherein the contents of said second containers can be transferred from one of said second containers into said first container and back, or into another second container.

10 Claims, 9 Drawing Sheets

CLOSED REACTION VESSEL SYSTEM

This application is the U.S. national phase of International Application No. PCT/SE2005/000628 filed 29 Apr. 2005, which designed the U.S. and claims priority to SE 0401145-8 filed 30 Apr. 2004, the entire contents of each of which are incorporated herein by reference.

FIELD OF THE INVENTION

The present invention relates to a closed reaction vessel system and a method of performing chemical reactions using this reaction vessel system. More particularly, the invention is directed to an apparatus or a system of interconnected vessels having means for moving the contents of one vessel into another, e.g. flexible walls and/or one or more pistons and, optionally one or more actuators; valves, tubing, and optional containers for reagents, bulk chemicals and waste as desired, as well as a method for handling e.g. samples and reagents while obtaining a high degree of homogenization.

BACKGROUND OF THE INVENTION

Experiments involving liquid phase chemical reactions are typically performed as batch reactions, e.g. by preparing a reaction mixture containing the chemicals directly involved in the reaction (generally referred to as reactants), and adding possible chemicals or factors facilitating the reaction like reaction buffer agents, enzymes or other catalysts, detergents and so forth.

These reactants are usually brought together in a reaction vessel, such as a test tube, beaker, flask or large vessel or tank, e.g. a bioreactor. After sealing, the contents of the reaction vessel are subsequently subjected to conditions, such as a temperature, pressure and/or controlled atmosphere, optimal for the desired reaction and kept there for an appropriate time for the reaction to occur. This is often referred to as incubation.

Some reactions are slow and in order to facilitate the reaction, some sort of mixing, stirring or agitation may be applied. This is done in order to enhance the mass transport in the reaction mixture, which is beneficial for the reaction. Such mixing can be automated using various types of devices like magnetic stirrers, vortexing machines and shakers, or performed manually, e.g. by shaking or agitating the reaction vessel.

In heterogeneous systems such as immunoassays, blots, micro array hybridizations and other solid phase reactions, there are often considerable problems related to slow mass transport. Typically one of the two molecular species involved in such reactions is immobilized on a solid support. This leads to kinetic limitations. In addition, magnetic stirrers and other mixing methods are difficult to apply to the reaction formats used for solid phase reactions.

There are also reactions taking place in non-homogeneous systems of the particle-suspension type, that is, cell and bead suspensions and reactions involving food stuffs, blood, plant or animal tissue or cells, soil and other sample derived matter.

Other examples of non-homogenous systems are reactions in the conduct of bioprocesses, fermentations etc., sample preparation or other purposes. In such systems, vigorous stirring or other homogenizing means like turbine agitation are applied not only to optimize the reaction conditions but also to avoid particle settling due to gravitation or to avoid clogging of separation filters etc.

In non-equilibrium systems like titration reactions, efficient homogenization is very important. In such analyses, one reactant is added incrementally in minute volumes. This is often done using a manual or automated burette. The results of each addition may be recorded colorimetrically or by other means, and magnetic stirrers are commonly used for mixing.

The increased mass transport achieved by mixing and stirring of reaction mixtures is desirable not only to increase the kinetics of individual reactions. Another reason is to reach homogeneous temperature in order to, inter alia, avoid too high temperatures at the bottom of the reaction vessel, which could ruin an experiment or a synthesis.

One problem associated with most types of mixing operations is that the reaction vessel usually contains a certain amount of air between the reaction mixture and the means for sealing, e.g. a lid or plug. This may lead to foaming or other unwanted effects. It is also not certain that the mixing performed leads to sufficient mass transport enough to give the desired benefits. The mass transport properties achieved might also be difficult to reproduce in subsequent experiments. If, instead, the reaction vessel is filled up completely to the lid leaving only a minimum of air left on top of the reaction mixture, it is even more difficult to obtain a mixing or convection that gives the desired enhanced mass transport. An exception in this case is to use a magnetic stirrer in which an iron rod is placed at the bottom of the reaction vessel. An inert polymer usually covers such a rod in order to prevent chemical interaction between the iron and the reaction mixture. A rotating magnetic element under the reaction vessel will force this rod to rotate which leads to convection and hence elevated mass transport in the reaction mixture.

However, there are drawbacks also with magnetic stirring. The major problem is to introduce a stirrer, such as a magnetic stirrer, to the reaction mixture, the stirrer constituting a separate physical element, which has to be removed before proceeding into downstream procedures. The stirrer may also be a source of contamination in certain type of experiments.

The methods for stirring and mixing reactants mentioned so far are furthermore not efficient enough for certain purposes, e.g. situations in which a high degree of homogenization is necessary, or in case of liquids with high viscosity. Certain homogenizers are designed for this purpose. The typically force the reaction mixture to pass narrow apertures or tunnels under high pressure, said apertures or tunnels having baffles or similar structures eventually leading to strong convection or even turbulence. A problem with such constructions is the short duration of the homogenization and the risk for shearing of components in the reaction mixture. Therefore the homogenization procedure often needs to be repeated in several cycles to complete the reaction using such homogenizers.

Another drawback with the above mentioned methods to homogenize chemical reactions is the batch type of reaction format, that is, chemicals to be introduced to the reaction vessel or aliquots to be drawn from it typically need to be transferred by means of a pipette or a dispenser. This can take place only after opening some closure of the reaction chamber, which often has to be resealed after the procedure. In most cases, a continuous-flow process or closed handling would be preferred.

One objective of the present invention is to provide means for homogenizing reaction mixtures in order to increase the kinetics and speed of reaction, overcoming the above listed drawbacks and disadvantages of the prior art processes.

Another objective is to make available a system for mixing and simultaneous dosing or metering of reagents and/or samples.

A third objective is to make available a system or on-line sampling and sample handling, such as sample extraction and analysis.

A fourth objective is to make available the components for building complex yet flexible systems for closed handling of fluids, preferably liquids, as well as systems built using these components.

Further objectives, their solutions and the advantages associated therewith, will be evident to a skilled person upon study of the description, examples and claims.

PRIOR ART

WO01/42487 discloses a device for the extraction of nucleic acids in which pre-dispensed vessels containing sample and buffer are interconnected and the combined content of said vessels homogenized by forcing the liquid back and forth from one volume to another through a narrow passage. By using pre-dispensed vessels, one at a time connected to a vessel containing a binding matrix, pipetting steps are avoided.

U.S. Pat. No. 6,566,461 discloses a method and apparatus for reacting a plurality of different mixtures in parallel in a semi-batch or continuous mode. The entire apparatus may be placed on a rocker of rotation plate for mixture as the reaction is proceeding.

Ocean Optics (Dunedin, Fla., USA) provides a "sequential injection analyzer" (FIA-SIA-LOV unit) for chemical analyses comprising a computer-controlled six-position valve, syringe pump and spectrophotometer flow cell. It automates wet-chemistry laboratory procedures like sample dilution, reagent addition and sample mixing. In this instrument, the chemical reactions take place within a valve manifold. It is compatible with a range of components like UV and fibre-optics spectrometers, light sources, and optical fibers for absorbance and fluorescence analysis.

Loeb Equipment & Appraisal Company (Chicago, Ill., USA) make available a series of bioreactors in which homogenization is achieved using turbine agitation, jacketed propellers or other similar means. In such devices it is important to generate a mass transport high enough to achieve sufficient homogenization and at the same time to avoid shearing forces in the reaction mixture.

Advalytix AG (Brunnthal, Germany) provides instruments to increase mass transport on microarrays. In these instruments, acoustic waves are applied to speed up and increase the sensitivity and reproducibility of micro array analyses.

U.S. Pat. No. 5,817,954 and U.S. Pat. No. 6,301,980 both disclose devices for automated titration. Both devices apply magnetic stirring as the means for homogenization.

WO 2000/58013 and WO 2004/045771 both teach methods and disclose devices for homogenization during thermal cycling and isothermal processes, in which centrifugation is applied to generate efficient convection in the reaction vessel.

SUMMARY OF THE INVENTION

The present inventor has surprisingly shown that the prior art problems of mixing, and homogenization, as well as dosing or portioning reagents and/or samples can be solved using a reaction vessel system for closed fluid handling, wherein said system comprises one first container to which at least two second containers are connected, the connections being such, that the contents of said at least two second containers can be passed into said first container or from one second container to another second container, and the dimensions and properties of the connections being adapted to thoroughly mix the contents.

Further aspects of the invention are apparent from the description, example and figures, as well as the attached claims, incorporated herein by reference.

BRIEF DESCRIPTION OF THE DRAWINGS

The invention will be described in closer detail in the following description, examples, and attached drawings, in which

FIG. 4 shows schematically an embodiment where the manifold itself encloses a volume (E), sufficient to receive at least part of the volume of the containers (A-D) connected thereto. As above, the manifold has a movable partitioning, in this case however without an aperture, thus constituting a movable sidewall, regulating the volume contained in the manifold. The movable sidewall can also be replaced by a flexible wall and means acting on the outside of said flexible wall. Further, one of the containers (D) connected to the manifold has a relatively larger volume, capable of receiving at least part of the total volume contained in the remaining containers (A-C) connected to the manifold. This way, the contents of A, B, and C can be sequentially or simultaneously added to E, mixed and transferred to D for incubation, analysis or the like.

In all embodiments, the manifold (M) and the volumes G and E can optionally be connected to auxiliary equipment, analysis equipment, or to further manifolds with corresponding vessels or containers.

Figure 9:
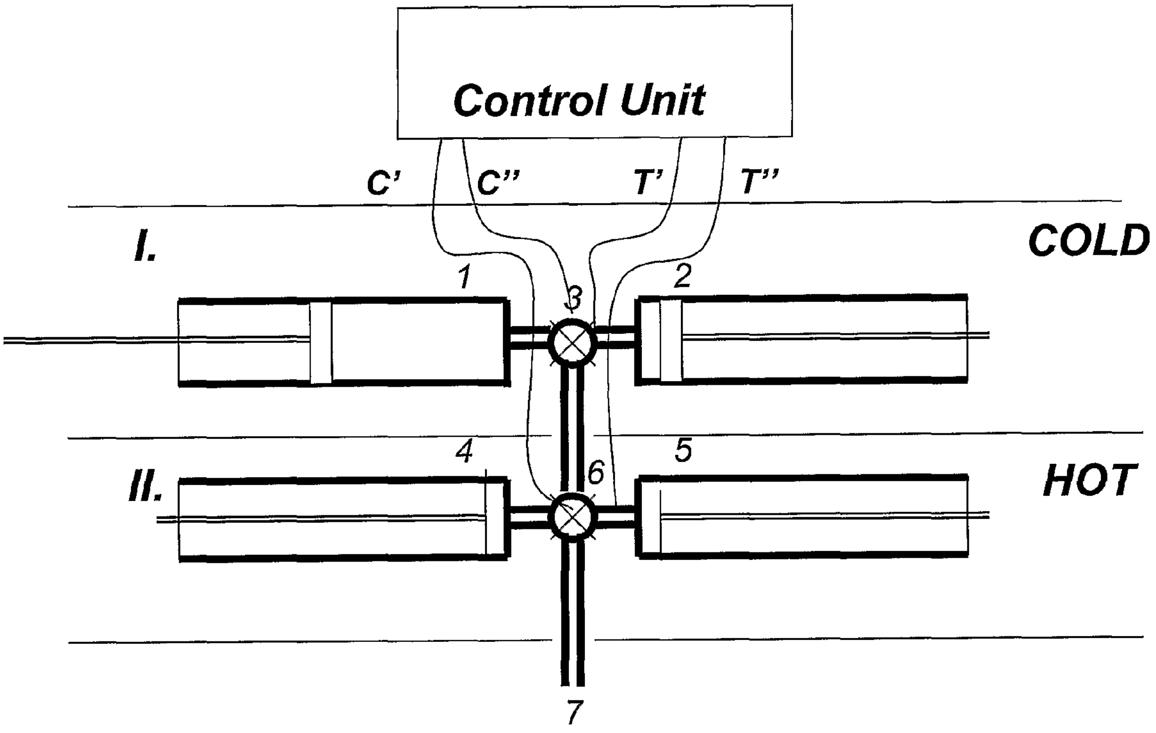
Figure 10:
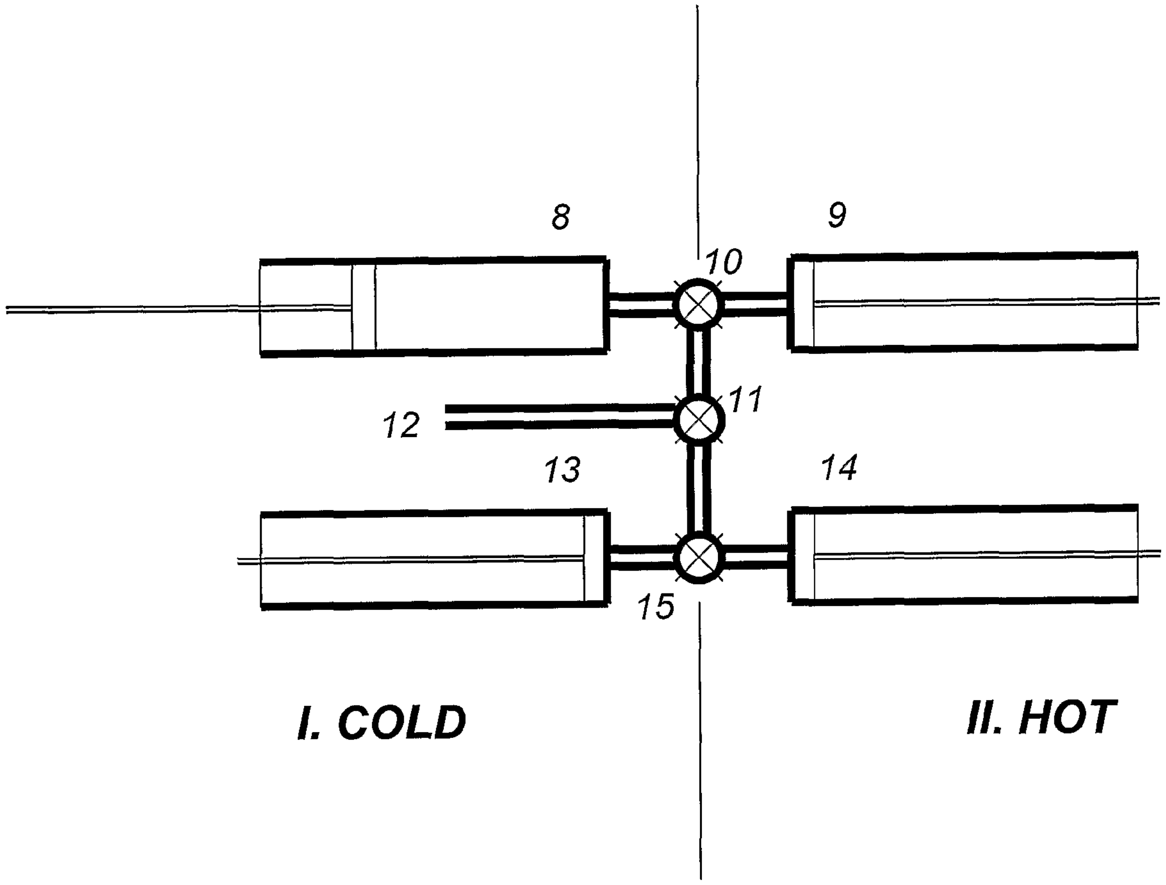

The following FIGS. 9 and 10 were included at the time of filing the international application:

FIG. 9 shows schematically an embodiment, where two reciprocating containers, here illustrated as substantially cylinder shaped containers (1 and 2) having a movable piston, are situated in a first area (I) kept at one temperature (here denoted “cold”) and two containers (4 and 5) situated in a second area (II) kept at a different temperature (here denoted “hot”). Through the provision of valves (3 and 6), fluid can be passed between the containers as desired. An inlet/outlet (7) is shown. A Control Unit is schematically shown, receiving input (T' and T") from temperature sensors, e.g. thermocouples, and sending control signals (C' and C") to the valves (3 and 6).

FIG. 10 shows schematically an embodiment related to that shown in the previous figure, but where the dividing wall between the areas kept at different temperatures runs perpendicular to that shown in FIG. 9. Again, two containers (8 and 13) are situated in a first area (I) kept at one temperature (here denoted “cold”) and two containers (9 and 14) in a second area (II) kept at a different temperature (here denoted “hot”). Valves (10, 11, and 15) are provided, as well as an inlet/outlet (12).

DESCRIPTION

The following definitions of relevant terms are used in the description and elsewhere in the present application:

The term “aperture” is used for an opening between at least two volumes, which may be more or less tubular and may contain baffles, fins or other structures to optimize the fluid dynamic conditions of fluids passing the aperture. According to the invention, the length, width and diameter of the aperture is adapted to create thorough mixing of the contents of liquids forced to pass through said aperture. In some embodiments, this aperture is more elongated, and is called a channel.

The term “component ” is used for a species belonging to the following group: a container, a cylinder, a panel, a reaction vessel, a syringe, a piston pump, a hydraulic pump, a manual pipette, an automatic pipette, a stepping motor, a cuvette, a fiber optic cable, a lens, an optic filter, a magnet, a vial, a Vacutainer®, a water sampler, an air sampler, a flask, a tank, a reactor, a combustion engine, a tubing, a separation filter, a separation column, a membrane, a slide, a dip-stick, a dot-blot membrane, a micro array, a burette, a spectrophotometer, pH-meter, a conductivity meter, a colorimetric meter, luminescence meter, a fluorescence meter, a photometer, a radiometer, a chromatograph, a device for two-dimensional chromatography, a camera, a biosensor, a device for electrophoresis, a device for mass spectrometry, a device for recording ion concentration, a device for recording gas concentration, a device for recording molecule concentration, a device for recording ethanol concentration, a densitometer, a gravitometer, a manometer, device for injection molding, a surface for solid phase binding of molecules, a bead suspension, an extraction matrix, a flow cytometer, a particle counter, a turbidimeter, a device for water content determination, a device for air content determination, a heater, a lamp, a halogen lamp, an IR-radiation source, a magnetron, a device generating microwaves, an ultrasound generator, a cooler, a liquid nitrogen cooler, an cooling-gas cooler, a refrigerated-air cooler, a thermistor, a thermocouple, a nipple, a valve, a stopper, or similar and combinations thereof. Some of the above devices, listed as “components” may also fall under the definition of “container” given above.

The term “container” is used for any hollow body capable of holding a fluid, having a geometry depending on its intended function or use, and having one or more openings with or without lids, valves or connections to other containers.

The term “homogenization” is used to describe a process in which a sample or a reaction mixture is brought to uniformity with respect to temperature or concentration, minimizing or removing gradients in temperature, concentration, pH or other parameters.

The term “manifold” is used for a body used for connecting at least two components. Such manifold is constructed and its components chosen so, that the dead space within said manifold and components is minimized.

The term “reaction mixture” is a fluid matter comprising at least one chemical, one or more phases, a melt, gas fermentation media, solvents, reaction buffers, reactants, solutions, suspension of particulate matter like beads, prokaryotic or eukaryotic cells, organic molecules, in which mixing or any type of physical or chemical reaction can occur.

The term “reaction” is intended to encompass any chemical or biochemical reaction, such as reactions involved in or constituting part of a PCR-amplification, a real-time detection PCR-analysis, a cycle sequencing analysis, a protein sequencing reaction, an LCR-amplification, an RCA-amplification, a proximity ligation assay, a target DNA-amplification, a signal amplification, a transcription, a reverse transcription, a translation, a restriction reaction, a ligation, a cloning procedure, an enzymatic reaction, a DNAse reaction, an RNAse reaction, a proteinase reaction, a cell-lysis procedure, a polymerisation process, a DNA-extraction procedure, an RNA-extraction procedure, a protein extraction procedure, a DNA purification procedure, an RNA purification procedure, a protein purification procedure, a procedure for the separation of biomolecules, a titration, cryogenic sample preparation, etc.

Figure 1:
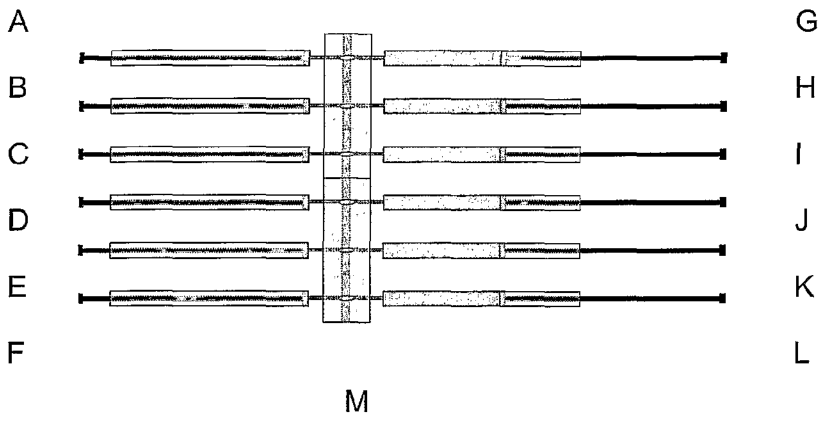
FIG. 1 shows schematically a system comprising twelve reciprocating containers or vessels (A-F, and G-L), all connected to a manifold (M), having valves making it possible to control the flow of the contents of one or several containers on the left hand side, to one or several of the containers on the right hand side, or between containers on the same side of the manifold. Using the valves, the contents of A can be transferred into any single one of vessels B-F and G-L, as well as to combinations of these vessels, e.g. from A to B, and from B to G, H, and I. Further, the contents of one or several vessels can be efficiently mixed by pumping e.g. the contents of A, B and C into G, and then passing the mixed contents between G and A, back and forth until sufficient mixing is achieved.

In its broadest aspect, said invention makes available a reaction vessel system for homogenizing and/or metering fluids, schematically illustrated in FIG. 1, wherein said system comprises one first container A, to which at least two second containers, e.g. B-F, or G-L, are connected, the connections being such, that the contents of one or both of said at least two second containers can be passed into said first container or from one second container to another second container. Said connections are preferably valves, or a manifold of valves. The position of the valves, and thus the direction of flow, can be regulated as desired, and is preferably automatically adjusted using operating devices, acting on the valves. Operating devices capable of operating a valve are well known to a person skilled in the art, and identifying suitable devices for operating the valves in a manifold according to the invention requires no inventive effort.

In said first and second containers, means are preferably provided for controlling the volume of said containers, e.g. forcing the fluid from a second container into said first container, or from a second container into another second container. Such means can be either internal means, such as movable sidewalls, pistons or a movable aperture, dividing a larger volume into two or more smaller volumes; or external means, such as pistons, rollers etc, acting on flexible walls of the containers.

Figure 2:
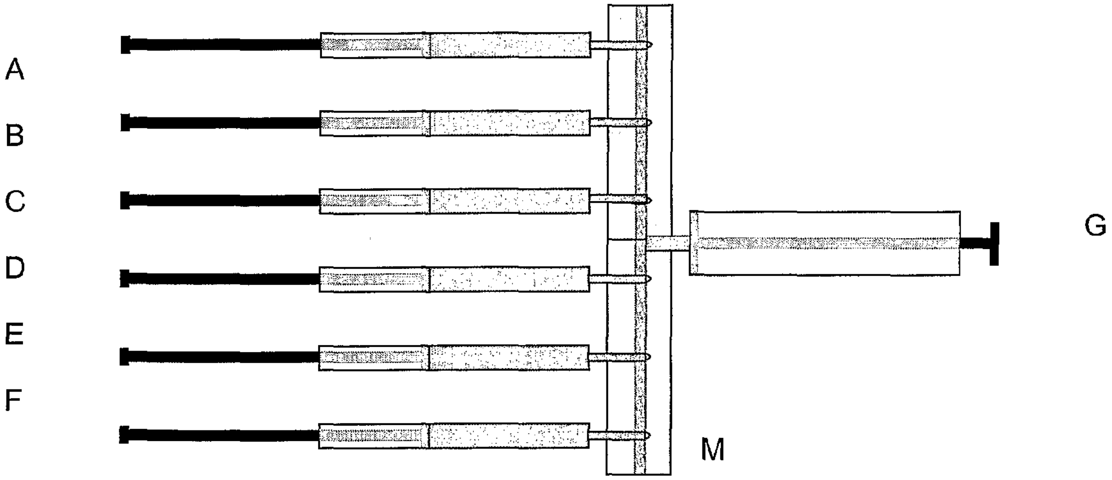
FIG. 2 shows schematically an embodiment where six first containers (A-F) are connected to a manifold (M), to which one second container (G) is connected, the volume of said second container begin the same or greater than the sum of the volumes of said first containers. This arrangement makes it possible e.g. to very efficiently mix the contents of the vessels A-F into G, and, if desired, to produce six aliquots of the mixed contents from G. The manifold (M) can optionally be connected to auxiliary equipment, analysis equipment, or to further manifolds with corresponding vessels or containers.

FIG. 2 shows another aspect of the invention where a number of second containers B-F are connected to said first volume A, further connected to yet another second container G, preferably having a volume corresponding to the total volume of the first mentioned first and second containers. A system as illustrated in FIG. 2 can advantageously be used for metering an equal or different volume of one or more reagents contained in a series of second containers into a receiving container G. Conversely, the same system can advantageously be used to aliquot a fluid, contained in a container G into several containers B-F through a manifold, optionally after mixing the contents with reagents in one first container A.

The system shown in FIG. 2 can also be used for sequential addition and mixing of reagents. If the uppermost container A is first emptied into the container B and further into the receiving container G while the connections or valves between the remaining containers C-F and the containers A and B are kept close, a reagent contained in the uppermost container A can be added to another reagent in B, mixed, and forwarded to the receiving container G. If then closing the connection/valves, and opening the next, the procedure can be repeated for each container C-F.

According to one aspect of the invention, said first container is a substantially tubular container defining a volume. Said volume is preferably very small compared to the volume of any single one of said second container. Conversely, the volume of said first container may be a volume equal to, or larger than, the total volume of said second containers.

In the FIGS. 1-5, and 7, the containers are schematically illustrated as syringes, but this is for illustration purposes only and not intended to limit the invention. While a syringe or any cylindrical container having a tightly engaged, movable piston remains a possible alternative. The second containers may also be flexible containers, pressurized containers etc. The means for controlling the volume of said second containers have here been illustrated as pistons, but this is again for illustration purposes only, and not limiting the invention. The means for controlling the volume are preferably pistons, driven by stepping motors, pneumatic actuators, electromagnets, etc, but can also be means acting on the outside of a flexible container, or means regulating the pressure and/or outlet of a pressurized container.

Figure 3:
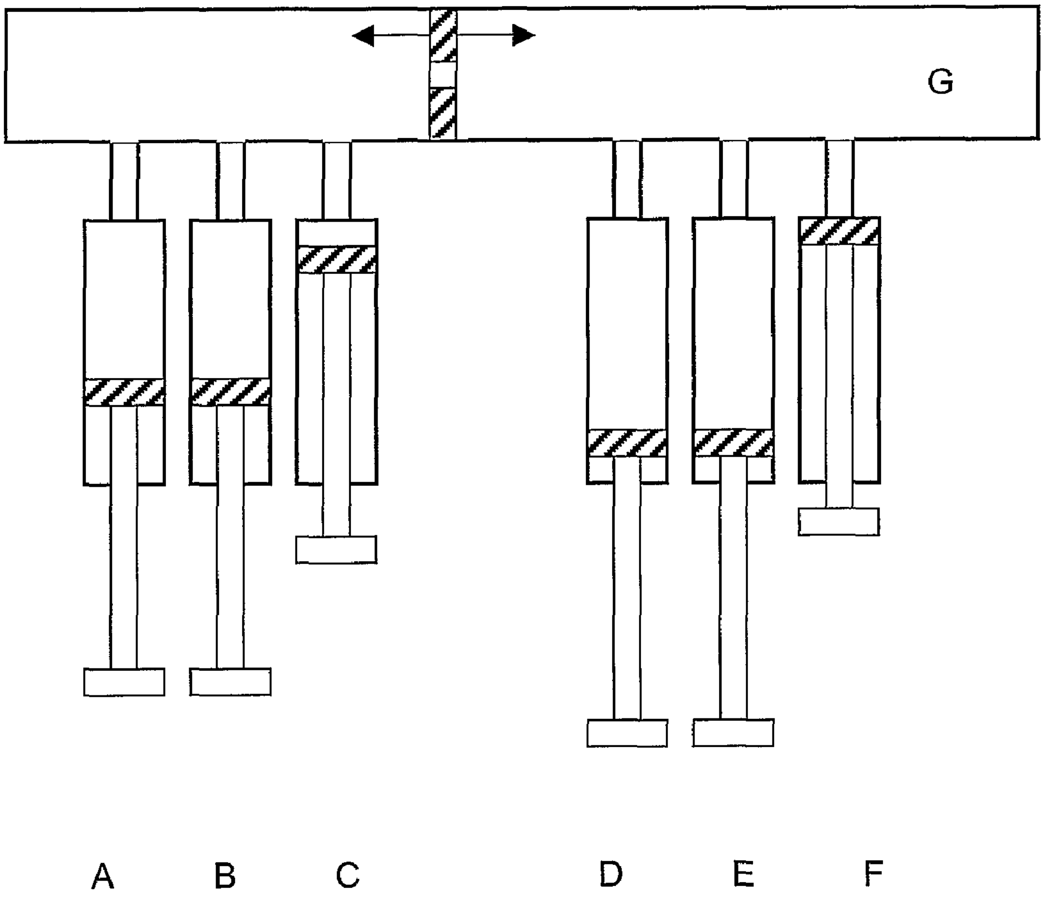
FIG. 3 shows schematically an embodiment where the manifold itself encloses a volume (G), sufficient to receive at least part of the volume of the containers (A-F) connected thereto. Further, the manifold contains a movable partition having an aperture, aiding in the mixing of the contents. In the alternative, the partition is fixed, and the surrounding container is movable. The latter alternative may be preferable when parallel mixing is desired, for example in a 96-well format.

According to one embodiment of the invention, illustrated in FIG. 3, the first container G has at least one partitioning wall, longitudinally movable inside said container, dividing said first container into sub-volumes, said partitioning wall or walls having an aperture through which fluid passes when said wall is moved within said container. The dimensions of the aperture are adapted to ensure thorough mixing of the contents of liquids forced to pass through said aperture.

Figure 4:
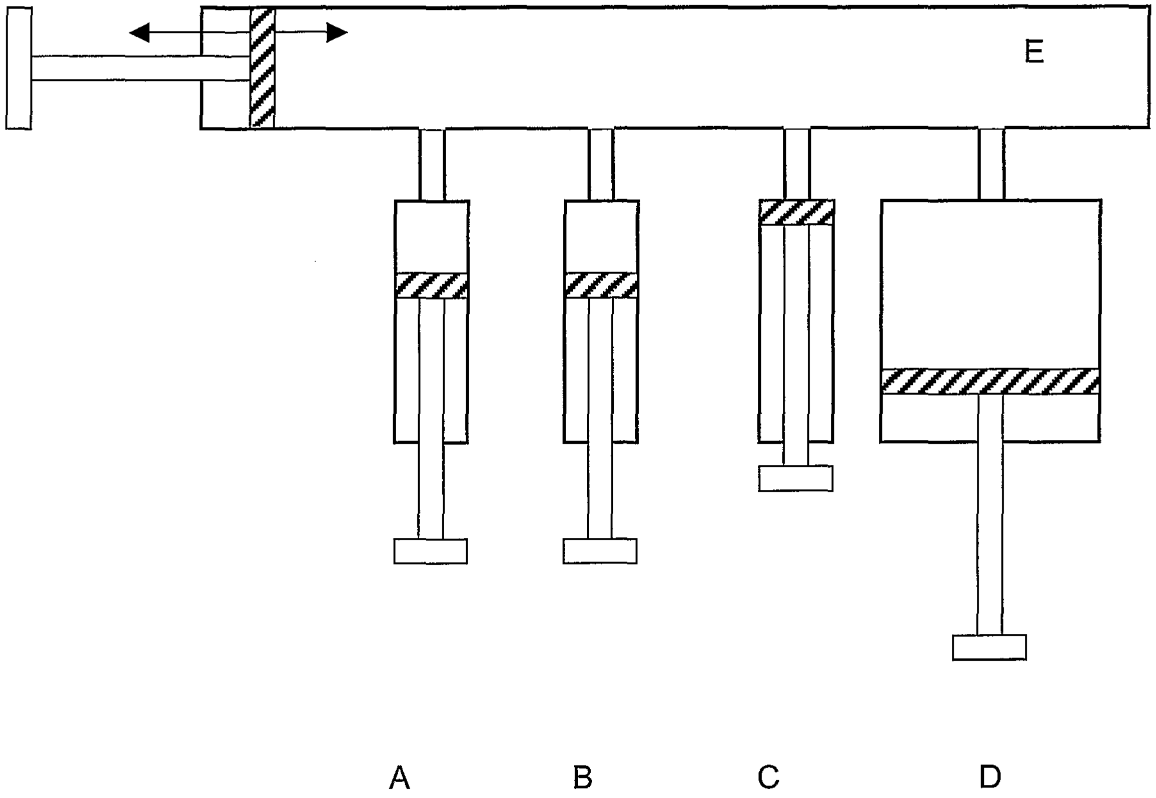

FIG. 4 illustrates a further embodiment, wherein said first container E has a piston, longitudinally movable within said container, and at least two second containers A, B, C and D, connected thereto, the volume of said second containers being such, that the total volume of all but one of containers (A, B, C) is equal to the volume of the remaining container (D). Optionally, said first container E has an outlet/inlet to further auxiliary containers or equipment.

Figure 5:
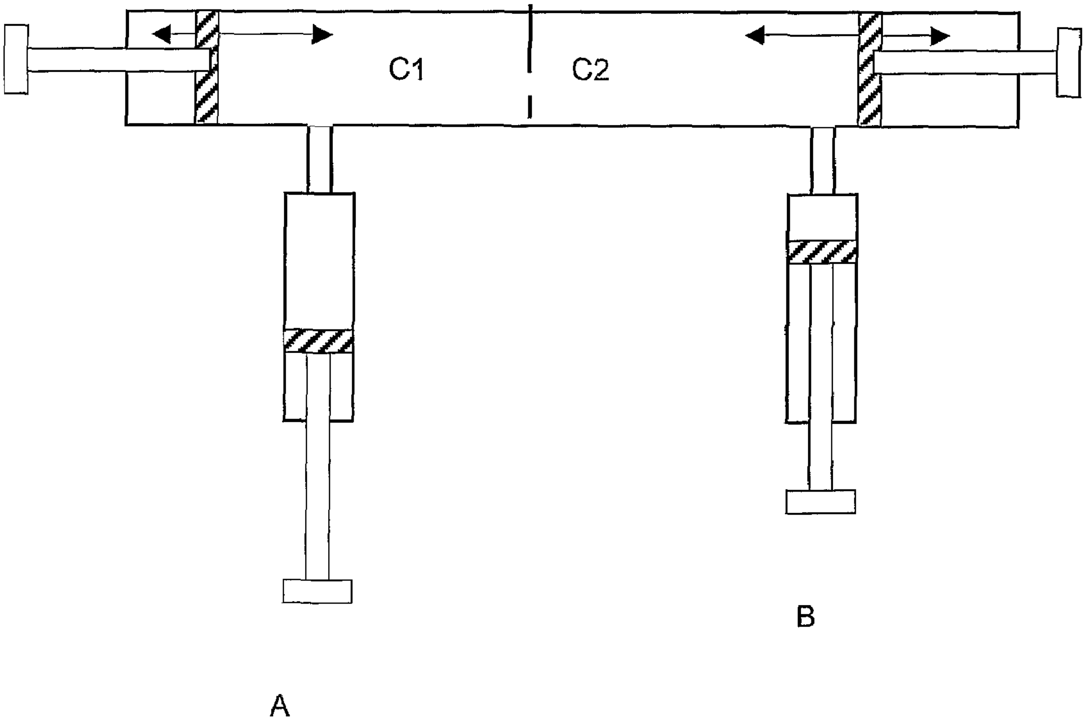
FIG. 5 shows an embodiment where two containers (A, B) are connected to a manifold comprising two sub-volumes C1 and C2, dived by a wall, having an aperture. Said wall with aperture is fixed, while the contents of A, B, C1 and C2 is subjected to movable sidewalls or pistons. The movable sidewalls and pistons can also be replaced by flexible walls and means acting on the outside of said flexible walls. A volume can be entirely enclosed in a flexible material, and the flow of fluid into and out of said volume effected by applying pressure to the outside of said volume.

According to a further embodiment, illustrated in FIG. 5, said first container C has at least one partitioning wall at a fixed position within said container, dividing the container into two sub-volumes C1 and C2, said wall having an aperture and at least one longitudinally movable piston, as well as at least one second container A or B connected thereto. Using a system as illustrated in FIG. 5, a sample or a reaction mixture can be introduced from A into the volume C1/C2, and thoroughly mixed by passing the volume through the aperture. After sufficient mixing/incubation, a reagent can be added from B into C1/C2 and again, thoroughly mixed by passing the volume through the aperture.

Figure 6:
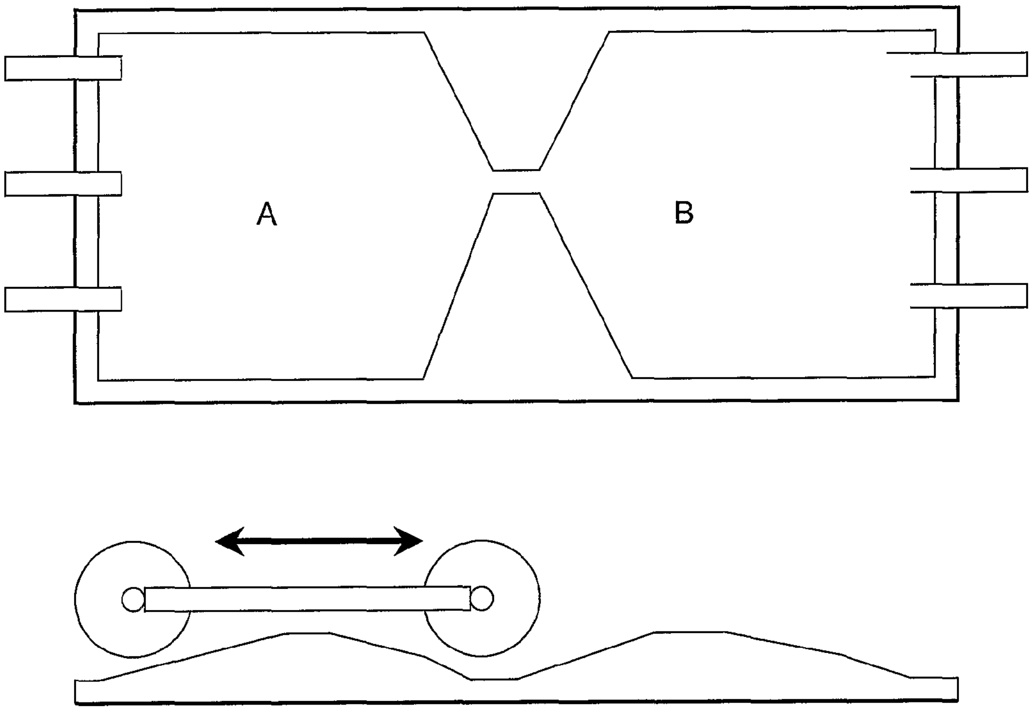
FIG. 6 shows schematically one embodiment, in principle similar to that illustrated in FIG. 5, where a flexible two-compartment container is used to perform sample handling, such as mixing and incubation. Two volumes A and B are enclosed by flexible membranes, and connected via a narrow channel, the length, width and diameter of the channel adapted to create turbulent flow and thorough mixing of the contents of A and B when they are forced to pass through said channel. Both volumes A and B can have inlets/outlets, and an inlet/outlet, e.g. for sampling, can be connected to the narrow channel (not shown).

FIG. 6 illustrates one embodiment where the containers or volumes A and B are defined by flexible membranes, and connected via a narrow channel. Both A and B may have further inlets/outlets as desired. The contents of A can be forced into B by applying pressure to the flexible membrane covering A, and vice versa. This can be achieved manually, by pressing or squeezing the container, or by passing a roller over the container. This can naturally also be automated, using suitable means, preferably a roller or a set of rollers, also indicated in FIG. 6.

Figure 7:
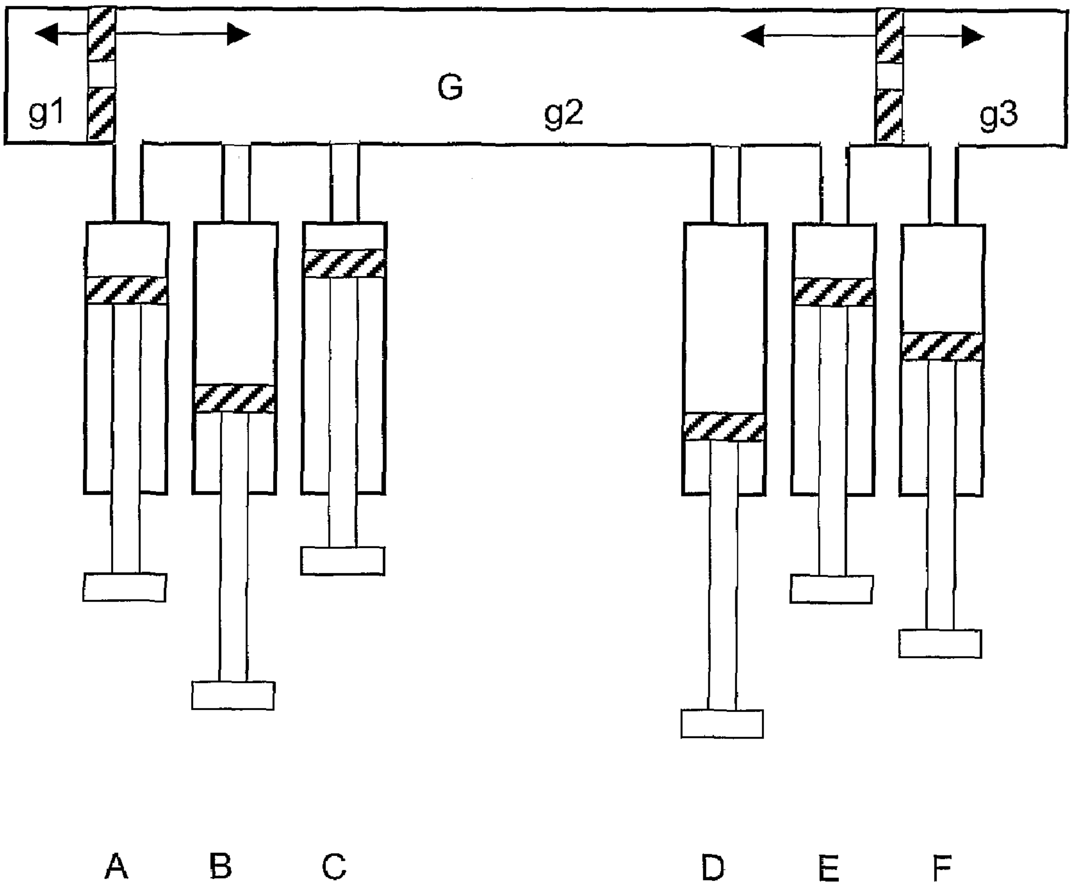
FIG. 7 shows schematically an embodiment similar to that shown in FIG. 3, however containing more than one movable partition, here illustrated as two movable partitions, each optionally having an aperture for mixing the contents of the volume G, divided by said partitions into sub-volumes g1, g2, and g3.

In FIG. 7 an embodiment similar to that shown in FIG. 3 is illustrated, the embodiment however containing more than one movable partition, here illustrated as two movable partitions, each optionally having an aperture for mixing the contents of the volume G, divided by said partitions into sub-volumes g1, g2, and g3. It is understood that this embodiment also can be realized using flexible membranes, as in FIG. 6.

According to the above embodiment, the container as well as the partitioning wall is kept fixed and the two end walls of the container is moved back and forth establishing a flow through the aperture or apertures that corresponds with the first two embodiments. This embodiment is preferred when the invention is used in a system in which reaction vessels according to the invention is connected to other system components like vials, flasks, valves, filters, heating means, cooling means, micro arrays, light sources, fluorescence recording means, luminescence recording means, membranes, matrices, fiber optic devices, stepping motors or other components to comprise an analysis instrument. Combinations between the above aspects or embodiments of the invention may be used for bioreactions, chemical synthesis, biochemical analysis, microbiological analysis, environmental monitoring and the analysis of biohazardous agents.

FIG. 9 illustrates an embodiment where a number of containers 1 and 2 are placed in a first area or compartment kept at a first temperature, for example a refrigerated area (here denoted "cold"). Other containers, 4 and 5, in fluid connection to the previously mentioned containers are placed in a second area or compartment, kept at a second temperature, for example a heated area (here denoted "hot"). The containers are in fluid connection with each other and an inlet/outlet 7 through valves 3 and 7. The "hot" and "cold" areas are separated by an insulated partition, through which a fluid connection is provided. The "hot" and "cold" areas can also be achieved by arranging cooling means in close proximity to one or more containers, and is desired, heating means in close proximity to one or more containers. Cooling means may comprise circulating fluids, such as air, water or other cooling medium, circulating in a loop around the container or containers and through a heat exchanger. Similarly, the heating means may comprise circulating fluids, electric heating, IR irradiation, micro wave elements, etc. The heating may also be achieved partially or entirely through the vigorous agitation.

The device according to the invention also preferably comprises means to measure the temperature of the reaction mixtures, as well as means to control the valves connecting the containers. Similarly, the device preferably comprises means to measure relevant parameters, such as, but not limited to, absorbance, reflectance, turbidity, pH, etc. The technical application of the device determines which parameters are of interest, and a skilled person can chose the necessary means for the control/measurement of these parameters.

In this and similar embodiments, a sample can be introduced into the system through an inlet 7, and mixed with a suitable reagent in e.g. in container 1, and the reaction mixture mixed by vigorously passing the mixture from container 1 to container 2, through valve 3. Due to the vigorous mixing, which in itself may raise the temperature of the reaction mixture, the effective mass transport and homogenization, leads to rapid and effective temperature homogenization. By controlling the "outside" temperature and the duration of mixing within the "cold" or the "hot" area, the temperature of the reaction mixture can not only be accurately controlled, but also rapidly changed between pre-set temperatures. Without the rapid and efficient agitation, the temperature control would either be slower, or the temperature of the reaction mixture would run the risk of over- or under-shooting. With the present system, efficient temperature adjustments are achieved. In conventional PCR-systems, a ramping speed of about 1-3°/sec is achieved. Using the system according to the present invention, considerably higher ramping speed can be achieved without compromising accuracy and homogenization. Data obtained using a device according to WO 2000/58013 showed that a ramping speed of about 6°/sec can be achieved. The ramping speed is highly volume dependent, but preliminary data using a prototype of the device according to the present invention indicate that a ramping speed of about 10°/sec can be achieved. One embodiment of the present invention is therefore a device for performing PCR using sample volumes of approximately 100 μl, wherein the thermal cycling is performed at a ramping speed of more than 3°/sec, preferably more than about 4°/sec, and most preferably in the interval of about 5 to about 15°/sec or higher. In smaller volumes, a correspondingly faster ramping is achieved.

PCR (polymerase chain reaction) is a molecular biological method for the in vitro amplification of nucleic acid molecules. Using the technology according to the present invention, improved speed and accuracy in the thermal cycling steps is achieved. Further, the inventive method and device guarantees temperature uniformity in the reaction mixture. Additionally, the invention makes possible a volume-independent PCR, i.e. the above advantages are achieved regardless of volume. Presently, the sample volume in PCR is limited to about 100 μl as the thermal homogenization otherwise becomes incomplete, or takes too long. The possibility to handle larger volumes offers many advantages; larger sample volumes can be used, sensitivity is improved, reagent volumes become less critical, sample preparation can be minimized or even excluded, to mention a few examples. Thus, the present invention concerns a device and method with large flexibility with regard to sample volumes, meaning that samples in the interval of about 1 μl to about 10 ml and above can be handled. Volumes approaching 10 ml and above are of particular interest when the process to be performed is preparative PCR.

The means to control the volume of a container, or to force a sub-volume of the reaction mixture through an aperture or apertures may be, as illustrated above, means using movable pistons or partitioning walls. Alternatively, the container or containers is/are moved, keeping the piston or partitioning wall fixed. The liquid will then flow through the aperture or apertures. Alternatively, as in a second embodiment, the partitioning wall is moved, and the container is kept fixed. Either principle can be used when the invention is used in a system in which reaction vessels according to the invention is connected to other system components like vials, flasks, tanks, coppers, valves, filters, heating means, cooling means, matrices or other components to constitute a bioreactor or a chemical synthesizer.

The system according to the present invention is advantageously used for all homogenization purposes, such as dissolving, suspension, mixing of two-phase reactants not soluble in each other, etc.

One advantage of the invention is that the handling is truly closed, that is the presence of air pockets, bubbles or the like can be eliminated. This means that a reaction can be conducted in one phase only, if desired. This is advantageous when handling samples, reagents or reactions where the presence of air, foaming or the formation of bubbles negatively influences the progress of the reaction, the quality of the end product, or the accuracy of an analysis or measurement, conducted on the reaction or end product.

Another advantage consists in the safety aspects, offered by a closed system according to the invention.

Further advantages include the possibilities of automation, offered by the system according to the invention.

EXAMPLE

Figure 8:
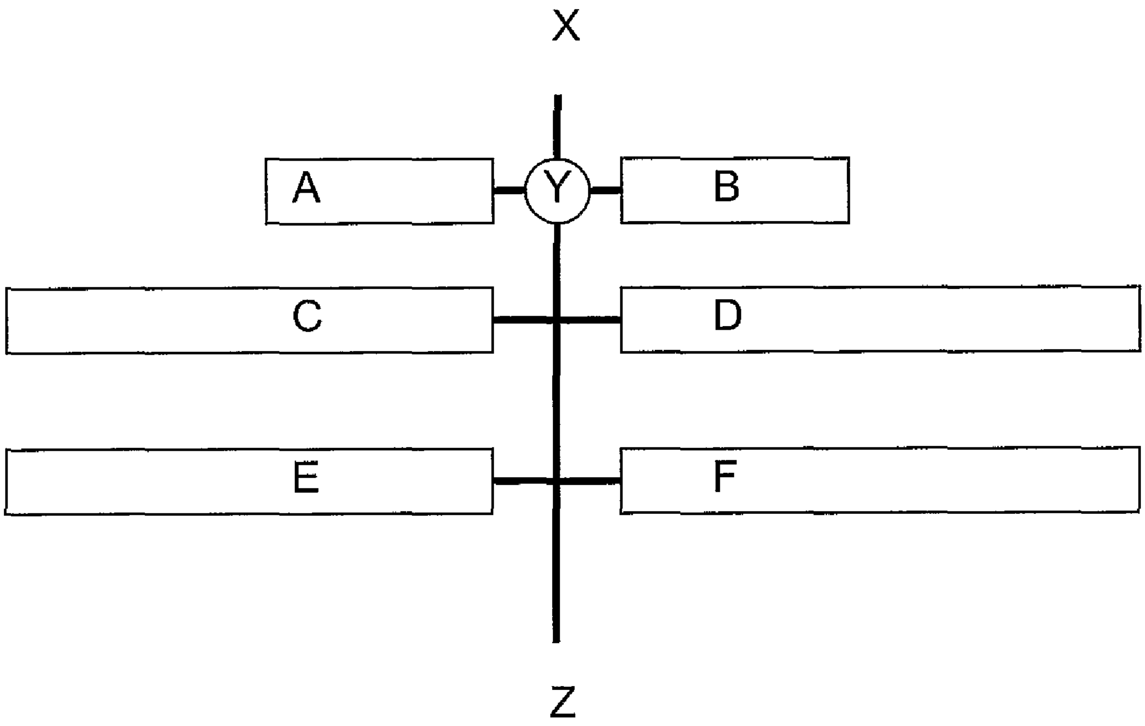
FIG. 8 shows schematically a device for on-line sample extraction, treatment and analysis according to one embodiment of the invention.

A device for sample extraction and analysis was designed, consisting of two reciprocating vessels (A and B), each delimited at one end by a movable piston (not shown), connected to a pneumatic actuator and the two vessels being in fluid contact with each other via a four-way valve (Y). The device is schematically shown in FIG. 8.

In one working prototype, disposable syringes were used, each syringe connected to a pneumatic actuators acting on the piston in the syringe. The pneumatic actuators were supplied by pressurized air from a tank, with a compressor, tubes, valves, and servos, synchronizing the motors in a reciprocating fashion.

The four way valve (Y) had an inlet (X) and an outlet, one of said inlet/outlet being in fluid connection with a larger volume, from which samples were taken on-line, and the other being in fluid connection with a manifold having four reciprocating vessels (C, D, E, and F), each delimited at one end by a movable piston, connected to a pneumatic actuator, and the four vessels being in fluid contact with each other and with the two first mentioned vessels. An outlet, for the purpose of discharging waste, was also provided (Z).

A 200 μl blood sample was withdrawn trough X from the larger volume (not shown), and introduced into the space of the first two reciprocating vessels, or at least one thereof, by means of driving the corresponding pneumatic pump in such fashion, that the volume defined by the piston and the walls of the first vessel or vessels, becomes larger, thus aspirating a sample.

In an example where the sample was a process fluid, the sample was efficiently homogenized by passing the sample between the first two reciprocating vessels, through the four-way valve (Y). When aspirating the sample, one of the first two reciprocating vessel contained a lysis buffer (5 M sodium iodide solution) and a solid binding matrix (fibre glass). When homogenizing the sample, this was simultaneously thoroughly mixed with the reagent/buffer.

In the experiments, the pneumatic actuators were run at different frequencies in the interval of 5 to 20 Hz or strokes/sec. Sample volumes in the interval of 1 to 10 ml were used. The narrow passage connecting the different containers had a diameter of about one tenth of the container diameter.

Wash solution ("New wash" containing EtOH, sodium chloride, EDTA, TrisHCL, pH 8) and eluation buffer were added from either one of containers C, D, E or F. After sufficient homogenization and/or incubation, the sample was be analyzed in Y, for example calorimetrically, photometrically or in another suitable manner, known to a person skilled in the art. In one experiment, a sample was taken and applied to a conventional gel, the result showing that effective amplification was achieved.

Following analysis or other measurement, the sample was discharged through Z and the four-way valve, and the containers A, B and the connections between these, were cleaned and—if desired—disinfected by repeating the pumping and homogenization steps using one or more suitable solutions contained in one or more of the vessels C, D, E or F. Further simplifying the handling, the vessels A-F may be single-use or refillable cartridges, for example cartridges containing reagent and wash buffers for 1, 10, 20, 50 or 100 measurements, or any suitable number of measurements.

Although the invention has been described with regard to its preferred embodiments, which constitute the best mode presently known to the inventors, it should be understood that various changes and modifications as would be obvious to one having the ordinary skill in this art may be made without departing from the scope of the invention which is set forth in the claims appended hereto.

The invention claimed is:

1. A reaction vessel system for closed fluid handling, characterized in that said system comprises a first area and a second area separated by an insulated partition through which a fluid connection is provided between at least two first containers positioned in the first area and at least two second containers positioned in the second area, all containers being in fluid connection, and the dimensions and properties of the connections being adapted to homogenize the contents, and the temperature of the contents being changed between different pre-set temperatures in the first and second area, respectively.

2. The system according to claim 1, wherein cooling means is/are provided in the first area.

3. The system according to claim 2, wherein the cooling means comprise(s) means for circulation of cooling fluids around the containers.

4. The system according to claim 1, wherein heating means is/are provided in the second area.

5. The system according to claim 4, wherein the heating means comprise(s) means for circulation of heating fluids, electric heating, IR irradiation or microwave elements.

6. The system according to claim 4, wherein the heating means comprise(s) means for agitation of contents.

7. The system according to claim 1, wherein means for measuring the temperature of the content is/are provided.

8. The system according to claim 1, wherein means for controlling valves provided in the fluid connections is/are provided.

9. The system according to claim 1, wherein means for measuring absorbance, reflectance, turbidity or pH of the contents is/are provided.

10. The system according to claim 1, wherein the volume of the contents is in the range of 1 μl-10 ml.

* * * * *